US006594394B1

(12) United States Patent
Strömberg et al.

(10) Patent No.: US 6,594,394 B1
(45) Date of Patent: Jul. 15, 2003

(54) FAST COMPRESSION AND TRANSMISSION OF SEISMIC DATA

(75) Inventors: JanOlov Strömberg, Täby (SE); Amir Averbuch, Jaffa (IL); Francois G. Meyer, Guilford, CT (US); Anthony A. Vaddiliou, Tulsa, OK (US)

(73) Assignees: GeoEnergy, Inc., Tulsa, OK (US); Fast Mathematical Algorithms and Hardware Corporation, Hamden, CT (US)

( * ) Notice: Subject to any disclaimer, the term of this patent is extended or adjusted under 35 U.S.C. 154(b) by 0 days.

(21) Appl. No.: 09/509,063

(22) PCT Filed: Jul. 22, 1999

(86) PCT No.: PCT/US99/16846
§ 371 (c)(1),
(2), (4) Date: Mar. 20, 2000

(87) PCT Pub. No.: WO00/05599
PCT Pub. Date: Feb. 3, 2000

Related U.S. Application Data
(60) Provisional application No. 60/098,858, filed on Sep. 2, 1998, and provisional application No. 60/093,708, filed on Jul. 22, 1998.

(51) Int. Cl.[7] .............................. G06K 9/36; G06K 9/46

(52) U.S. Cl. ...................... 382/232; 382/244; 382/239; 382/245; 382/233; 382/248

(58) Field of Search ................................. 382/232, 233, 382/244, 239, 245, 235, 240, 248, 264; 367/13, 14, 43, 46, 49, 59, 63, 73, 74, 76, 77; 341/51, 59, 79, 107; 708/203, 317, 400, 800, 801; 702/2, 6, 14; 375/240.18, 240.19

(56) References Cited

U.S. PATENT DOCUMENTS 4,509,150 A * 4/1985 Davis .......................... 367/76

(List continued on next page.)

FOREIGN PATENT DOCUMENTS

| DE | 196 26 600 A1 | 1/1997 |
| EP | 0 849 610 A1 | 6/1998 |

OTHER PUBLICATIONS

Ronald R. Coifman & Mladen Victor Wickerhauser; "Entropy–Based Algorithms for Best Basis Selection"; *IEEE Transactions on Information Theory*; U.S.; IEEE Inc. New York; vol. 38, No. 2 Pt 02; pp 713–718; Mar. 1992.

(List continued on next page.)

*Primary Examiner*—Phuoc Tran
*Assistant Examiner*—Amir Alaui
(74) *Attorney, Agent, or Firm*—J. Robert Brown, Jr.; Hunton & Williams LLP

(57) ABSTRACT

Apparatus and method for performing fast compression and decompression of seismic data. An adaptive transform (124) with selectable mathematical basis is applied to an initial data set to obtain a set of transformed coefficients, the transform factorizing an effective symmetric or non-symmetric biorthogonal filter of size (u, v) into a number m of elementary (3, 1) biorthogonal filters which are applied to the data set in selected directions without requiring transposition of the data set. The coefficients are encoded (126) using non-uniform scalar quantization and run-length coding followed by adaptive coding of resulting threshold coefficients. The transform and encoding steps are repeated (128) using a new mathematical basis for each iteration to obtain a compressed data set at a desired compression rate. Exact compression ratios can be obtained (158), allowing evaluation of the data in the compressed domain as well as transparent, on-the-fly decompression at computer network data transfer rates.

14 Claims, 9 Drawing Sheets

U.S. PATENT DOCUMENTS

| | | | |
|---|---|---|---|
| 4,760,563 A | | 7/1988 | Beylkin |
| 4,862,167 A | * | 8/1989 | Copeland, III .............. 341/107 |
| 5,084,844 A | * | 1/1992 | Wang ........................... 367/59 |
| 5,384,725 A | | 1/1995 | Coifman et al. |
| 5,526,299 A | | 6/1996 | Coifman et al. |
| 5,745,392 A | | 4/1998 | Ergas et al. |
| 6,021,378 A | * | 2/2000 | Reiter et al. .................. 702/14 |
| 6,061,299 A | * | 5/2000 | Grouffal et al. .............. 367/49 |
| 6,160,918 A | * | 12/2000 | Pigeon ........................ 382/248 |
| 6,160,919 A | * | 12/2000 | Hale ........................... 382/250 |
| 6,370,477 B1 | * | 4/2002 | Vermeer ...................... 702/14 |

OTHER PUBLICATIONS

F. G. Meyer, A. Z. Averbuch, J. O. Strömberg and R. R. Coifman; "Multi–layered Image Compression"; *Wavelet Applications in Signal And Imaging Processing VI*; San Diego, CA USA; 22–23; vol. 3458; pp 128–139; Jul. 1998.

F. G. Meyer, A. Z. Averbuch, J. O. Strömberg and R. R. Coifman; "Fast Wavelet Packet Image Compression"; Proceedings DCC '98 Data Compression Conference (C at. No. 98 TB 100225), Proceedings DCC '98 Data Compression Conference, Snowbird, UT USA; p 563; Mar. 30–Apr. 1, 1998.

W. C. Chang, J. D. Kuo, Y. M. Huang, C. L. Huang, L. C. Wu, J. K. Wang and R. S. Liu; "Lossless Image Compression Methods For Pet Imaging"; *Biomedical Engineering*; US; Plenum Press; vol. 8, No. 3; pp 309–316; Jun. 25, 1996.

* cited by examiner $$\underline{W} = \begin{pmatrix} h_0 & h_1 & h_2 & & & & & & \cdots & & & h_{-2} & h_{-1} \\ g_0 & g_1 & g_2 & & & & & & & & & & \\ h_{-2} & h_{-1} & h_0 & h_1 & h_2 & & & & & & & & \\ 0 & 0 & g_0 & g_1 & g_2 & & & & & & & & \\ & & h_{-2} & h_{-1} & h_0 & h_1 & h_2 & & & & & & \vdots \\ & & & & g_0 & g_1 & g_2 & & & & & & \vdots \\ \vdots & & & & & & & & & & & & \\ h_2 & & & & & & & & & & h_{-2} & h_{-1} & h_0 & h_1 \\ g_2 & & & & & \cdots & & & & & & & g_0 & g_1 \end{pmatrix}$$

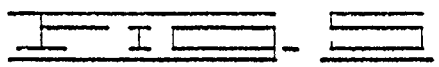

$$\underline{W} = \begin{pmatrix} h_0 & h_1 & h_2 & & & & & & \cdots & & & & \\ -\overline{h}_1 & -\overline{h}_0 & -\overline{h}_{-1} & & & & & & & & & & \\ h_{-2} & h_{-1} & h_0 & h_1 & h_2 & & & & & & & & \\ 0 & 0 & -\overline{h}_2 & \overline{h}_0 & -h_{-1} & & & & & & & & \\ & & h_{-2} & h_1 & h_0 & h_1 & h_2 & & & & & & \vdots \\ & & & & -h_1 & h_0 & -h_{-1} & & & & & & \vdots \\ \vdots & & & & & & & & & & & & \\ h_2 & & & & & & & & & & h_{-2} & h_{-1} & h_0 & h_1 \\ -\overline{h}_{-1} & & & & & \cdots & & & & & & & \overline{h}_1 & \overline{h}_0 \end{pmatrix}$$

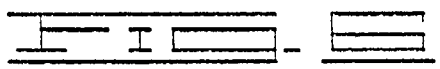

$$\underline{H}_\alpha = \begin{pmatrix} 1 & \alpha & & & \cdots & & & \alpha \\ 0 & 1 & 0 & & & & & \\ & \alpha & 1 & \alpha & & & & \\ & & 0 & 1 & 0 & & & \\ \vdots & & & & & & & \vdots \\ & & & & & \alpha & 1 & \alpha \\ & & & & \cdots & & 0 & 1 \end{pmatrix}$$

FIG. 7

$$\underline{G}_\beta = \begin{pmatrix} 1 & 0 & & & \cdots & & & \\ \beta & 1 & \beta & & & & & \\ & 0 & 1 & 0 & & & & \\ & & \beta & 1 & \beta & & & \\ \vdots & & & & & & & \vdots \\ & & & & & & 1 & 0 \\ \beta & & & & \cdots & & \beta & 1 \end{pmatrix}$$

FIG. 8

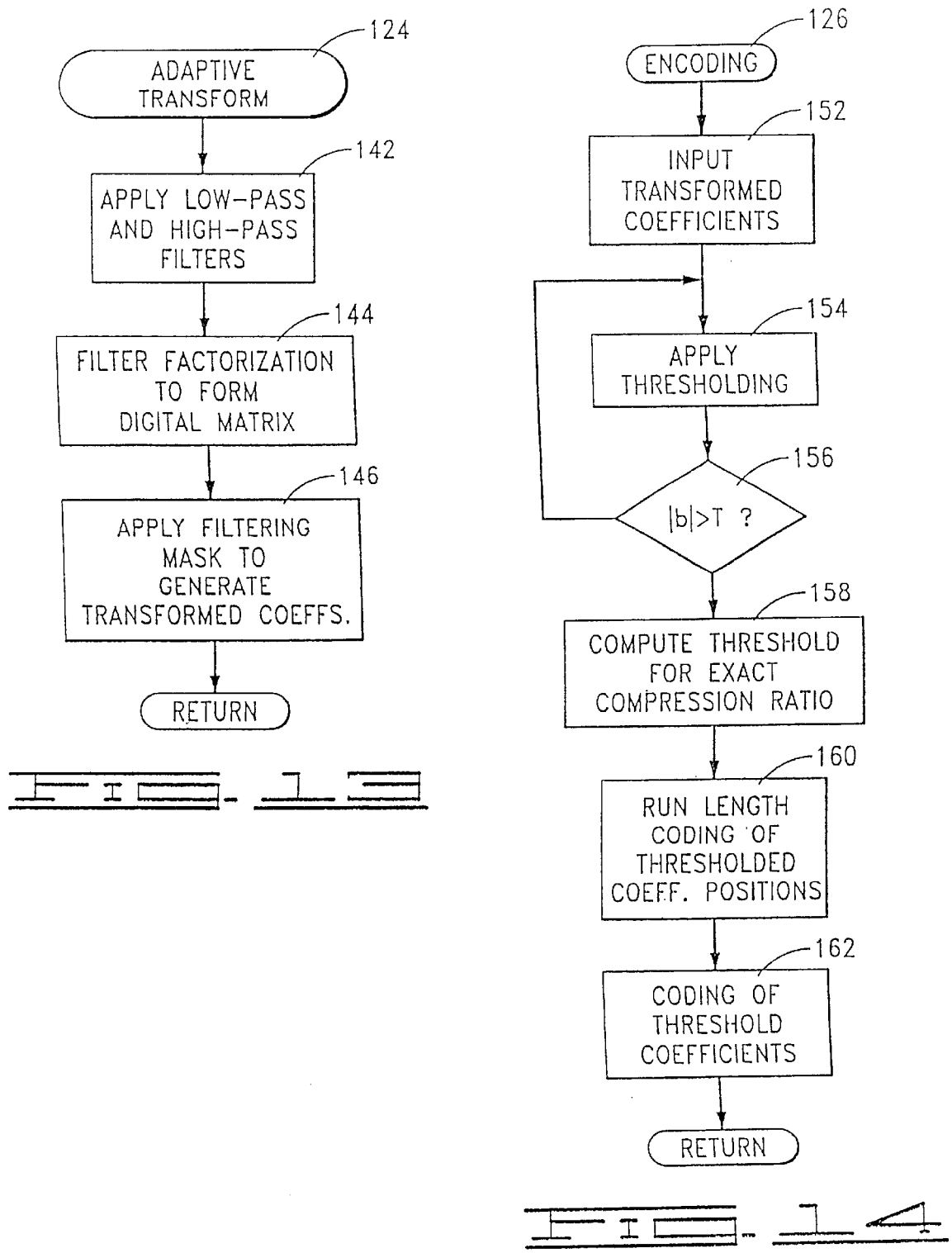

FAST COMPRESSION AND TRANSMISSION OF SEISMIC DATA

This application is a 371 of PCT/US99/16846 filed Jul. 22, 1999, and claim benefit of Provisional No. 60/093,708 filed Jul. 22, 1998 which claims benefit of Provisional No. 60/098,858 filed Sep. 2, 1998.

FIELD OF THE INVENTION

The present invention relates generally to the field of seismic exploration, and more particularly, but without limitation, to an apparatus and method for efficiently processing seismic data sets to reduce data storage and transmission requirements.

BACKGROUND

Seismic exploration for oil, gas and other subterranean mineral deposits often begins with a seismic survey to identify suitable locations where such deposits might be found. These surveys are often carried out using acoustic wave techniques, wherein a wave source is employed to direct wave energy toward a surface of the earth (such as an ocean bottom). The wave energy travels downwardly into the earth and is reflected from various subterranean features back to a receiver array. The reflected wave energy provides information regarding the structure of various subterranean layers of rock, enabling decisions with regard to the desirability of further exploration at a given location.

By using multiple receivers arranged in a selected pattern, vast amounts of computerized, multi-dimensional image data can be obtained from the array. Depending upon the extent of the survey, the magnitudes of resulting seismic data sets can exceed several tens of terabytes ($10^{12}$ bytes) of data.

As will be appreciated, the storage, transmission and analysis of a data set of such magnitude can be extremely burdensome. Even with the continued advancements in satellite and internet data transmission techniques and computer processing and storage hardware and software solutions, the transmission of a multi-terabyte data set can take days, if not weeks, to complete. Moreover, the storage of such a data set can require a large number of magnetic storage devices (such as disc drives arranged in a RAID array). Data access and security backup are also substantial issues that require significant resources to address.

Accordingly, various data compression techniques have been employed in the art to reduce the storage and transmission requirements of large data sets, such as obtained during seismic surveys. For example, seismic data compression techniques have been recently discussed in Luo and Schuster, "Wave Packet Transform and Data Compression," $62^{nd}$ Annual Intern. Mtg. Soc. Expl. Geophys., 1992; Reiter and Heller, "Wavelet Transformation-Based Compression of NMO-Corrected CDP Gathers," $64^{th}$ Annual Intern. Mtg. Soc. Expl. Geophys., 1994; Donoho, Ergas and Villasenor, "High-Performance Seismic Trace Compression," $65^{th}$ Annual Intern. Mtg. Soc. Expl. Geophys., 1995; Vassiliou and Wickerhauser, "Comparison of Wavelet Image Coding Schemes for Seismic Data Compression," $67^{th}$ Annual Intern. Mtg. Soc. Expl. Geophys., 1997. See also U.S. Pat. No. 5,745,392 issued to Ergas et al., the general teachings of which are incorporated herein by reference.

The Ergas U.S. Pat. No. 5,745,392 reference is typical of prior art wavelet compression techniques, and generally teaches to 1) apply a wavelet transform to the data to generate subbands of transformed data in first, second and third dimensions; 2) apply uniform quantization to the subbands using integer equivalents representing ranges of values; 3) compress through lossless compression the redundant integer replacements; and 4) store the compressed data.

While operable, there are nevertheless limitations associated with these and other prior art approaches. For example, the Ergas U.S. Pat. No. 5,745,392 reference requires matrix transposition during the wavelet transformation, which is a computationally inefficient process to perform. Further, only approximate compression rates are obtained, so that each subset (gather) of the data can have a slightly different size (number of bytes), making difficult the exact identification of the beginning point for a selected gather. Moreover, at least some of the steps in the disclosed method are lossy, meaning that there is some degradation between the original data and the compressed data. While attempts are made to confine the majority of the losses to frequency ranges of little interest, substantial degradation of the decompressed data for high compression ratios in ranges of interest can nevertheless occur.

Accordingly, there is a continuing need for improvements in the manner in which large data sets, such as seismic surveys, are compressed and processed. It is to such improvements that the present invention is directed.

SUMMARY OF THE INVENTION

The present invention is directed to an apparatus and method for fast seismic data compression and a hardware/software integration platform for very fast data transmission through a data network.

The fast data compression method can achieve data compression ratios exceeding 100:1 for three dimensional (3-D) seismic data, with low noise degradation for subsequent seismic data processing of pre-stack data in the compressed domain or interpretation of post-stack seismic data. For lower compression ratios, such as from about 5:1 to about 20:1, the method produces essentially lossless compression through the use of a multi-layered data compression structure.

In accordance with a first aspect of the present invention, the data compression method generally comprises a fast multi-dimensional transform which uses an adaptive basis selection. Preferably, the transform is characterized as utilizing wavelet packets, local cosines, brushlets or other libraries of orthogonal/biorthogonal bases. Particularly, this step includes biorthogonal filter factorization, which occurs prior to filtering and reduces the computational time for a 1-D convolution by a factor of two, reduces the computational time for a 2-D convolution by a factor of four and a 3-D convolution by a factor of eight. Moreover, unlike the prior art the transform step requires no matrix transposition, significantly reducing computational complexity.

A second step in the method involves a novel coding approach which includes non-uniform scalar quantization of the wavelet packet transformed data and adaptive lossless run length coding of the thresholded quantized transform coefficients.

A third step involves repeating the first two steps over successive compression iterations to create a layered/hybrid/cascaded data compression algorithm. Thus, the different curves, surfaces, shapes and textures of the data are coded employing a different mathematical basis in each iteration. The quantization residuals are calculated at the end of each iteration and the first two steps are repeated as desired to achieve a preselected noise level or signal to noise (SNR) ratio.

In another aspect of the present invention, the data are decompressed by first determining how many compression iterations were employed in the compression process, after which the data are decompressed by applying a decoding step, which involves application of a run-length lossless decoding scheme, and an adaptive inverse transform step. These decoding and inverse transform steps are successively applied the same number of times as the original number of iterations during the compression operation. The decompressed data are thereafter combined with the residuals to output the decompressed data.

In another aspect of the present invention, a hardware/software scheme is employed to efficiently transmit and process data in a computerized network, such as a local area network (LAN) or a wide area network (WAN). A computer is dedicated as a decompression engine and is attached to the network using a high transfer rate interface (such as fibre-channel). A high capacity RAID is also attached to the network and stores the data which has been compressed as discussed above. A request for selected portions of the data causes the compression engine to select and decompress the data at a rate that meets or exceeds the available transfer rate of the interface, so that the decompression operation is transparent to the user.

These and various other features and advantages which characterize the present invention will be apparent from a reading of the following detailed description and a review of the associated drawings.

BRIEF DESCRIPTION OF THE DRAWINGS

FIG. 5 illustrates an N×N matrix representing an N×N non-decimated orthogonal operator used in accordance with preferred embodiments during the compression routine of FIG. 2.

FIG. 6 provides another representation for the non-decimated orthogonal operator.

FIG. 7 is a matrix representing a high-pass orthogonal operator.

FIG. 8 is a matrix representing a low-pass orthogonal operator.

FIG. 13 is a flow chart illustrating in greater detail steps carried out during the adaptive transform step of the routine of FIG. 2.

FIG. 14 is a flow chart illustrating in greater detail steps carried out during the encoding step of the routine of FIG. 2.

FIG. 16 is a functional block diagram for a local area network (LAN) based system, illustrating a preferred environment for the execution of the routines of FIGS. 2 and 15.

DETAILED DESCRIPTION

Figure 1:
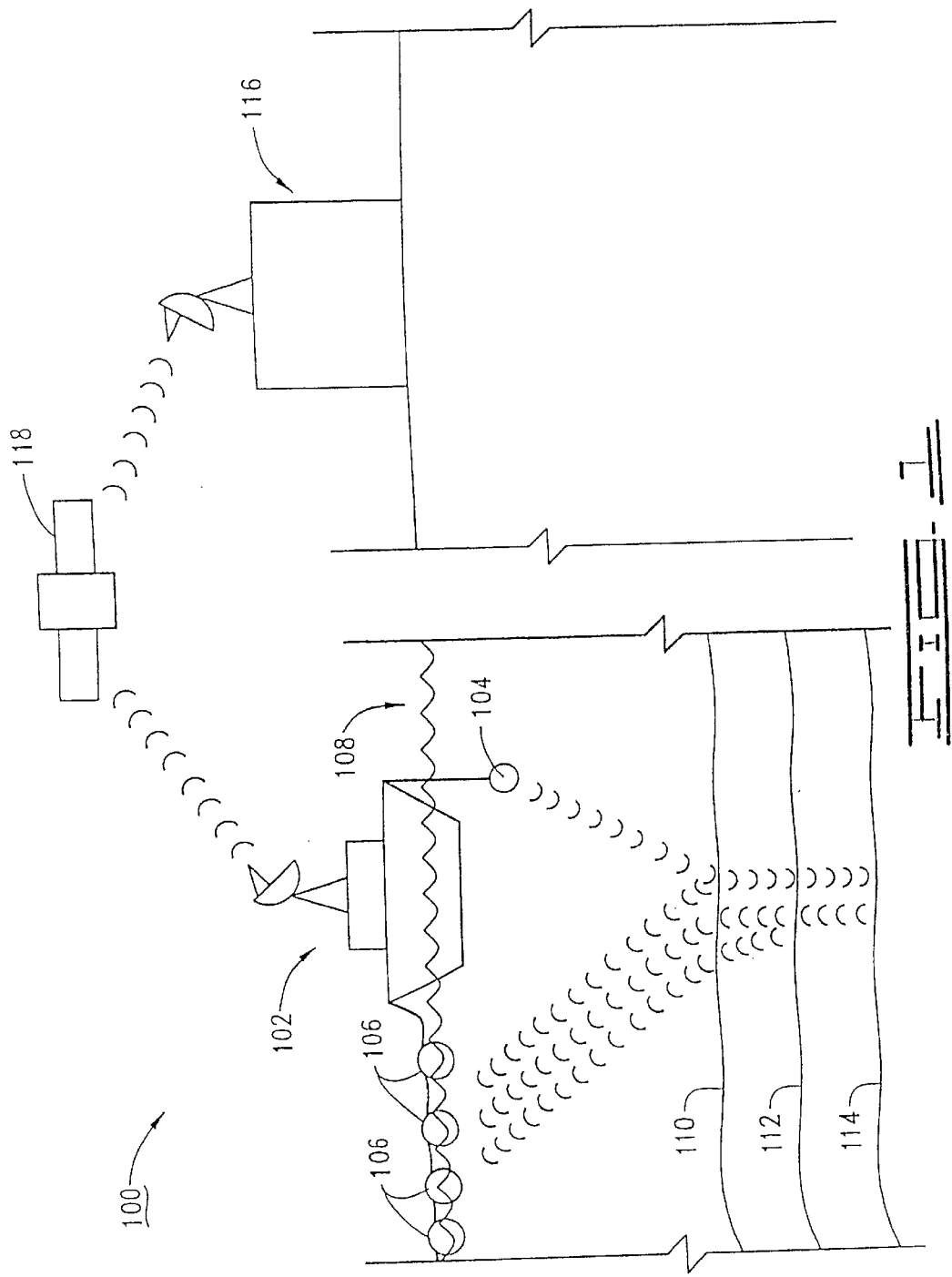
FIG. 1 provides a schematic representation of an oceanic seismic survey system of the type used to obtain seismic data which can be processed in accordance with preferred embodiments of the present invention.

Referring now to the drawings, FIG. 1 provides a schematic representation of an oceanic seismic survey system 100 of the type used to obtain seismic data which can be processed in accordance with preferred embodiments of the present invention. The system 100 includes the use of a seismic vessel 102 having an acoustic wave source 104 and a towed array of spaced-apart receivers 106. For example, the towed array can comprise a total of four to eight streamer cables which are towed in parallel behind the vessel 102, with each cable having a large number (such as 240) of the floatable receivers 106 which are serially attached to the cable.

During operation, the vessel 102 transverses the surface of an ocean 108 in a regular pattern while periodically directing acoustic wave energy (referred to as "shots") downwardly from the source 104. The wave energy is reflected back to the receivers 106 at an ocean floor boundary 110, as well as at subterranean boundaries (such as 112, 114). The signals detected by the receivers 106 are converted to digital form and stored in computerized data storage equipment (not shown) aboard the vessel 102. It is common to subsequently transmit the resulting data sets to a land-based processing center 116 using a suitable system, such as a satellite communication system 118.

The seismic data sets can be manipulated to produce three dimensional representations (images) of the resulting subterranean features, enabling decisions with regard to the desirability of further exploring a given location for oil and gas deposits. Because the seismic data are arranged in two spacial dimensions and one time dimension, as well as on a per shot basis, seismic data sets can quickly reach several tens of terabytes ($10^{12}$ bytes) in size. Thus, to allow near real-time reporting of the seismic data sets to the processing center 116 (while the vessel 102 is still on location), the data are typically compressed and a compressed data set are transmitted via the satellite communication system 118. For reference, one prior art approach for carrying out such compression is disclosed in the aforementioned Ergas U.S. Pat. No. 5,745,392 reference. Preferred approaches to compressing data for transmission from a seismic vessel such as shown at 102 will be discussed below.

At this point it will be noted that present invention can be utilized in other environments as well, such as to compress previously gathered data to improve data storage and processing capabilities within a data processing center such as 118. Hence, the discussion of the environment of FIG. 1 has been provided merely for purposes of illustration, and is not limiting.

Figure 2:
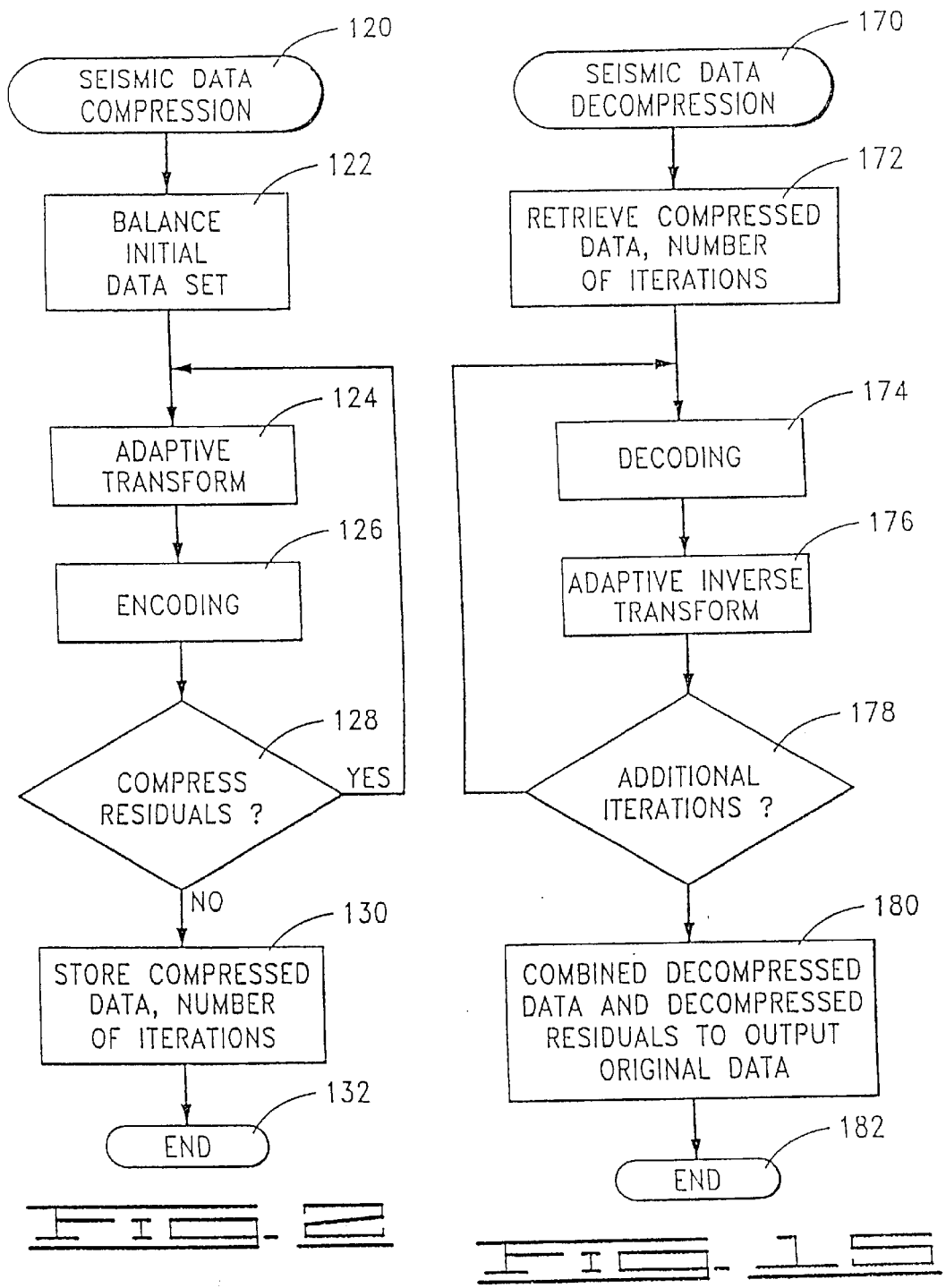
FIG. 2 provides a flow chart for a SEISMIC DATA COMPRESSION routine, illustrating the steps carried out in accordance with preferred embodiments of the present invention to compress seismic data.

FIG. 2 provides a flowchart for a SEISMIC DATA COMPRESSION routine 120, illustrating steps carried out to compress an initial set of data in accordance with preferred embodiments. The routine represents programming utilized by a suitable computer, such as a high performance desk top personal computer (PC) or workstation.

Additional details concerning each of the steps will be provided below, but initially it will be noted that the flow chart sequentially includes a data balancing step 122, an adaptive transformation step 124 and an encoding step 126. The steps 124 and 126 are preferably repeated a number of times as indicated by decision step 128, after which the compressed data and the associated number of iterations through the routine are stored at step 130. The routine then ends at step 132.

The balancing step 122 involves an initial balancing of the initial seismic data set using conventional automatic gain control (AGC) or time exponentiation techniques. For example, this step can comprise multiplying each amplitude at sample j with the time raised to the power equal to the time corresponding to the sample j.

The adaptive transformation step 124 is preferably carried out using a fast multi-dimensional transform which uses an adaptive basis selection. Preferably, the transform is characterized as utilizing wavelet packets, although local cosines, brushlets or other libraries of orthogonall biorthogonal bases can also be readily employed. Novel aspects of the transform will be presented in detail below, but it will be noted that the basic operation of these transforms are well known and have generally been described in the prior art; for example, see Averbuch, Aharoni, Coifman and Israeli, "Local Cosine Transform—a Method for the Blocking Effect in JPEG," J. of Math. Imaging and Vision, Vol. 3, 1993; Meyer and Coifman, "Biorthogonal Brushlet Bases for Directional Image Compression," $12^{th}$ Intl. Conf. On Analysis and Optimization of Systems, Images, Wavelets and PDEs, 1996.

In the prior art, most data compression algorithms including seismic data compression has been carried out using the wavelet transform in a manner generally as set forth by the aforementioned Ergas U.S. Pat. No. 5,475,392 reference. To contrast the use by the present invention of an adaptive transform including wavelet packet, local cosine or brushlet, the wavelet transform will first be briefly discussed.

As will be recognized by those skilled in the art, wavelet transforms provide a tool for local time-scale (frequency) analysis of signals. Essentially, wavelet transforms offer a multi-scale decomposition of an image (such as a seismic data image). Multi-scale decomposition means that the major low frequency trends of the image are captured at coarse (large) scale with a few large coefficients. As a result, these trends can be efficiently and compactly coded (compressed). An advantage of wavelet transformation with a number of vanishing moments, typically five to seven, is that a very sparse decomposition of two-dimensional piecewise smooth curves and three dimensional surfaces. In other words, smooth images or the smooth part of images can be coded very efficiently.

Nevertheless, the finer higher frequency trends are captured by finer (shorter) wavelet transform scales with a significantly higher number of coefficients, as compared to the smooth parts of the image. The coefficients describing the wavelet transform decomposition of these fine high frequency patterns are often small values very close to zero, and as a result, during quantization (the second step in the wavelet transform process), these small coefficients will be quantized to zero, leading to a loss of information. Thus, wavelet transform based compression is lossy to some degree, depending upon the frequency content of the data image.

In practice, the wavelet transform is applied separately, first in one dimension, after which the image is transposed and the transform is applied in a second direction. Within each application of the wavelet transform, there is one scaling and one wavelet analysis function. The scaling function low-passes the signal of interest, while the wavelet function provides the high-pass part of the signal for the subband specified by the scaling function.

Figure 3:
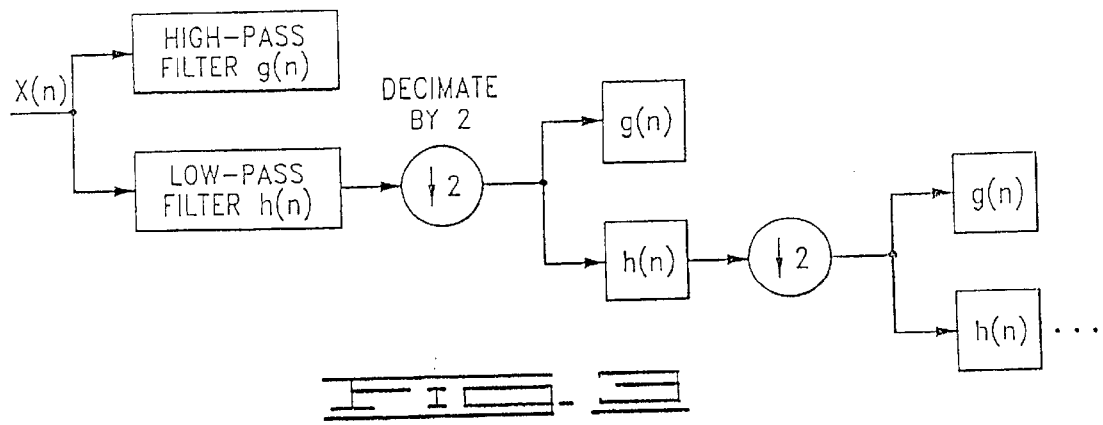
FIG. 3 shows the application of high-pass and low-pass filtering and decimation to a data set.

The wavelet transform is applied in one dimension by way of a filter bank. The original signal is split into two equal bandwidth spectral bands, with a low-pass filter being applied to the low-frequency part of the signal and a high-pass filter being applied to the high frequency part of the signal. The high-pass filtered part of the signal is preserved while the low-pass filtered part is decimated by a factor of two and filtered again with a low-pass and a high-pass filter. This process is repeated a number of times (levels, such as five to six) to yield a final result of the wavelet transform. The final result provides the lowest frequency subband with the coarsest scale and the remaining subbands providing progressively wider and higher frequency ranges. This operation is generally represented in FIG. 3.

By contrast, the wavelet packet transform of the present invention differs significantly from the wavelet transform. One difference is that within the wavelet packet transform, the high-pass filtered part of the signal is also decomposed into a low-pass and a high-pass signal. However, there are a significant number of possible combinations of subbands which can be used to reconstruct the signal. One way to get around this problem is by means of the best basis selection, such as disclosed by U.S. Pat. No. 5,384,725 issued to Coifman et al., and U.S. Pat. No. 5,526,299 issued to Coifman et al., the teachings of which are hereby incorporated by reference. This presents another difference between wavelet and wavelet packet transforms: the best-basis algorithm selects a particular subset of the wavelet-packet decomposition, which is the optimum according to some preselected additive criterion. In particular, the "best basis" paradigm permits a rapid order (Nlog(N)), where N is the number of signal samples search among a large number of orthogonal/biorthogonal bases to extract the basis which provides the best signal approximation.

Figure 4:
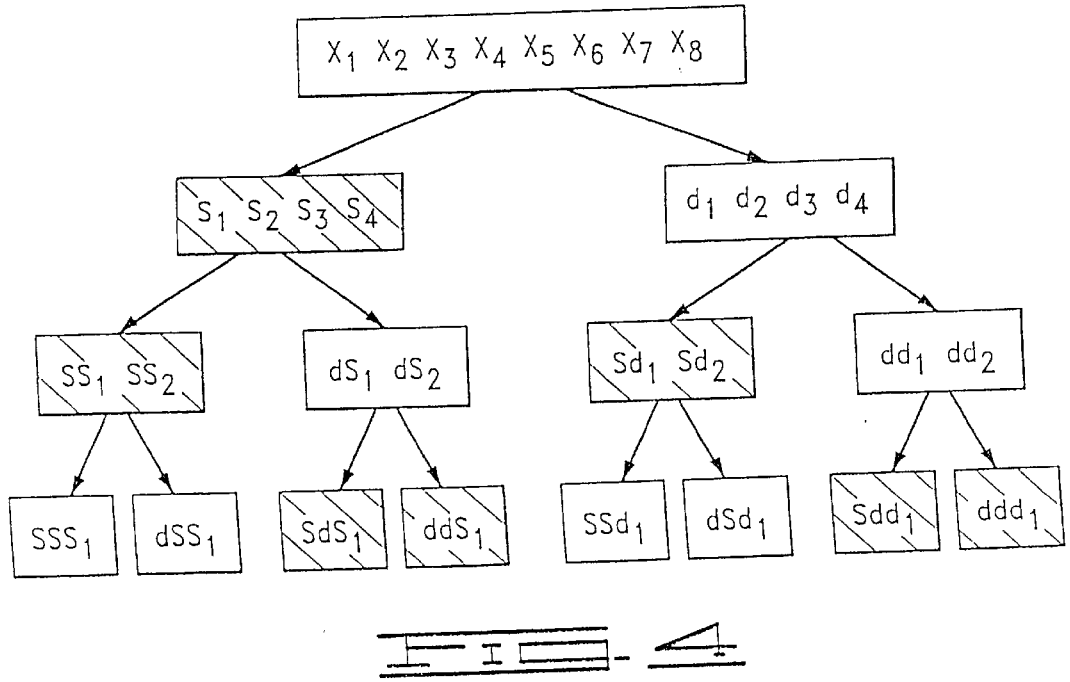
FIG. 4 is a node tree for selecting the best basis in a wavelet packet transform.

The best basis is extracted by employing a divide and conquer algorithm, which is illustrated by FIG. 4 which represents a binary tree of nodes. At each node of the binary tree, a convolution and a decimation are applied using the low-pass and the high-pass filters, with the prefix "s" representing the "sum" for the low-pass filter, and the prefix "d" representing the "difference" for the high-pass filter. the algorithm compares its coding cost with the cost of the union of the its two children nodes. If the node's cost is smaller than the combined children's cost, the node is retained; otherwise, the children nodes are retained. Such selection methodologies are well known and are discussed, for example, in Coifman, Meyer and Wickerhauser, "Wavelet Analysis and Signal Processing in Wavelets and their Applications," pp. 153–178, Jones and Bartlett, 1992; Coifman and Wickerhauser, "Entropy Based Algorithms for Best Basis Selection," IEEE Trans. Info. Theory, vol. 38, pp. 713–718, 1992.

The wavelet packets form a library of orthogonal functions with different localizations in time and frequency. While wavelets provide a unique decomposition of a signal, wavelet packets provide an overcomplete representation of the signal. In other words, there are more waveform functions than necessary to represent the signal of interest.

To carry out the wavelet or the wavelet packet transform, two filters are used: a low-pass and a high-pass filter. These two filters are conjugate quadrature filters satisfying the following general relations:

$$\delta_{0,k} = 2\sum_{n\in z} h_n h_{n,2k} \tag{1}$$

$$\sum h_n = 1$$

$$g_n = (-1)^n h_{1-n}$$

The wavelet packet coefficients w, j, are expressed by way of the low-pass filter and the high-pass filter and previously computed wavelet packet coefficients as follows:

$$w_{2n,j,l} = \sum h_{x-2l} w_{n,j+1,k} \quad \text{for } l = 0, 1, \ldots, N_2^{j-J} \tag{2}$$

$$w_{2n+1,j,l} = \sum g_{x-2l} w_{n,j+1,k} \quad \text{for } l = 0, 1, \ldots, N_2^{j-J}$$

$$w_{0,2l} = f_l \quad \text{for } l = 0, 1, \ldots, N$$

where the variable j is the scale of the wavelet packet transform. At the scale j, the distance between consecutive samples is $2^{-j}$, while for the finest scale J, the distance between consecutive samples is $2^{-J}$. The variable l is the wavelet packet localization parameter; the corresponding wavelet packet is roughly located at $l2^{-j}$. The variable n is the wavelet packet frequency, so that the wavelet packet has approximately n oscillations.

There are several practical issues related to the low-pass and the high-pass filtering part of the wavelet-packet transform. The first issue is the arbitrary size of the signal/image. Assuming that the signal/image is of arbitrary length N, the length is extended symmetrically at the end points of the sequence to arrive at an even periodic sequence of period 2(N−1). This signal extension generates a minimum number of coefficients and does not provide discontinuities at the boundaries.

Another important aspect of the adaptive transformation step 122 of the routine of FIG. 2 is the computational efficiency of the filtering computations. A typical 1-D wavelet transform step requires, for a biorthogonal filter of length (2 m+1, 2 m−1) an average of 4 m multiplications and 4 m additions per data point during the convolution/filtering step. The present invention, however, presents a significantly reduced computational load through a novel way to reduce filter size. Thus, for example, instead of convolving/filtering with a (9,7) biorthogonal filter, the filtering is carried out iteratively using a (3,1) filter. This reduction in filter size is obtained through filter factorization, which reduces sequentially the required filter size. As will become apparent below, the use of filter factorization results in a reduction in computational load by a factor of two in one dimension (1-D). In two dimensions (2-D), the filter factorization, combined with a new way to perform 2-D filtering without using matrix transposition as discussed below, results in a fourfold improvement in processing time. For higher dimensions such as 3-D or higher, improvements by a factor of eight or greater are readily attainable. This is significant in that existing prior art seismic data compression schemes can take several days to compress or decompress a one terabyte ($1\times10^{12}$ bytes) data set.

In order to explain the factorization of 1-D biorthogonal filters in accordance with preferred embodiments, the low-pass filter $h_n$ is assumed to have a length of five samples and the high-pass filter $g_n$ is assumed to have a length of three samples. It will be noted that the methodology can be used to factorize any symmetric or non-symmetric biorthogonal filter with length (u, v) to a number m of elementary (3, 1) biorthogonal filters. The following discussion can accordingly be extended to filters of different lengths. With a 1-D input signal x, the combined low-pass, high-pass filtering/decimation operation can be combined into an N×N matrix which represents an N×N non-decimated orthogonal operator W, as shown in FIG. 5.

The output transformed signal from one iteration of the filtering decimation y is given by the following equation:

$$y = W x \tag{3}$$

with explicit even and odd output $y_{2k}$ and $y_{2k+1}$ given by:

$$y_{2k} = \sum_i h_{i-2k} x_i \tag{4}$$

$$y_{2k+1} = \sum_i g_{i-2k} x_i$$

Since the high-pass coefficient can be expressed in terms of the conjugate filter $h_n$, as:

$$g_n = (-1)^{n+1} h_{1-n} \tag{5}$$

N×N matrix representing the non-decimated orthogonal operator which performs the filtering decimation can also take the expression as shown in FIG. 6.

In accordance with preferred embodiments, the N×N matrix of FIG. 6 is factored into at most m orthogonal operators, as:

$$W = H_{\alpha\mu} G_{\beta\mu} H_{\alpha\mu-1} G_{\beta\mu-1} \cdots H_{\alpha 0} G_{\beta 0} \tag{6}$$

where the matrices $H_\alpha$ and $G_\beta$ are provided in FIGS. 7 and 8, respectively. The operator $H_\alpha$ is a high-pass operator modifying only the low-pass coefficients, while the operator $G_\beta$ is a low-pass operator modifying only the high-pass coefficients. Both operators are orthogonal, thus:

$$H_\alpha^{-1} = H_{-\alpha}$$

$$G_\beta^{-1} = G_{-\beta} \tag{7}$$

In order to see more clearly that the N×N orthogonal operators $H_\alpha$ and $G_\beta$ are factorized, an alternative way is to make the N×N matrix Z equal to identity matrix I, as:

$$Z = W\, G_{\beta 0} H_{-\alpha 0} G_{-\beta\mu}^{-1} H_{-\alpha\mu}^{-1} G_{-\beta\mu} H_{-\alpha\mu} = I \tag{8}$$

To accomplish the factorization, first the matrix product $WG_{\beta 0}$ is formed in such a way that the end point of the high-pass filter $h_i$ and $h_{-1}$ is cancelled. The effect of this end point cancellation is that after this step, the high-pass filtering is performed with a filter with only one coefficient. At the same time, the matrix product $WG_{\beta 0}$ is getting closer to a diagonal matrix which is the ultimate goal of the filter factorization operation. Since the biorthogonal filters are symmetric, the value of $-\beta_0$ can be initially set as follows:

$$-\beta_0 = \frac{h_{-1}}{h_0} \tag{9}$$

Applying this relationship to a (5,3) biorthogonal filter, for k=−1, from equations (4) and (5) the low-pass and the high-pass conjugate quadrature filter coefficients are related as follows:

$$h_1 h_{-1} + h_2 h_0 = 0 \tag{10}$$

Figure 9:
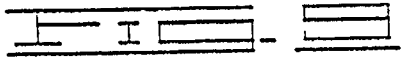
FIG. 9 is an N×N orthogonal operator formed from a selected combination of the operators of FIGS. 6 and 8.

Therefore, the coefficient $-\beta_0$ becomes:

$$-\beta_0 = \frac{h_2}{h_1} \quad (11)$$

which means that the end points of both the low-pass and high-pass filters $h_n$ and $g_n$ are cancelled. The resulting orthogonal matrix operator $WG_{\beta 0}$ is shown in FIG. 9.

By choosing the appropriate value of $-\alpha_0$, both ends of the low-pass filter are cancelled by the first factorization of the biorthogonal filter (5,3), which has been expressed by the term $WG_{\beta 0}$. The appropriate value of $-\alpha_0$ to cancel both ends $h^1_{-1}$ and $h^1_1$ is given by:

$$-\alpha_0 = \frac{-h_1^1}{h_0^1} \quad (12)$$

Figure 10:
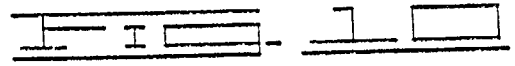
FIG. 10 is an N×N diagonal matrix formed from a selected combination of the operator of FIG. 9 with the operator of FIG. 7, the diagonal matrix facilitating very fast filtering decimation (without transposition).

Using this value of $-\alpha_0$ gives a resulting product $WG_{\beta 0}H_{\alpha 0}$ as represented in FIG. 10. From FIG. 10, it can be seen that with two iterations of the foregoing filter factorization for a (5,3) filter, a diagonal matrix (within a scale factor) is achieved. The diagonal nature of the matrix allows very fast filtering decimation during the wavelet packet transform.

In summary, the N×N orthogonal operator matrix W for a (2m+1, 2m−1) biorthogonal filter is factored into at most m operators with two alternative forms. The first orthogonal operator form operates on the low-pass filter coefficients, while the second orthogonal operator operates on the high-pass coefficients. The filtering operations executed by these filters are expressed as:

$$y_{2i} = x_{2i} + a(x_{2i-1} + x_{2i+1}) \quad (13)$$
$$y_{2i} = x_{2i+1}$$

and $$y_{2i} = x_{2i+1} \quad (14)$$
$$y_{2i+1} = x_{2i+1} + b(x_{2i} + x_{2i+2})$$

Figure 11:
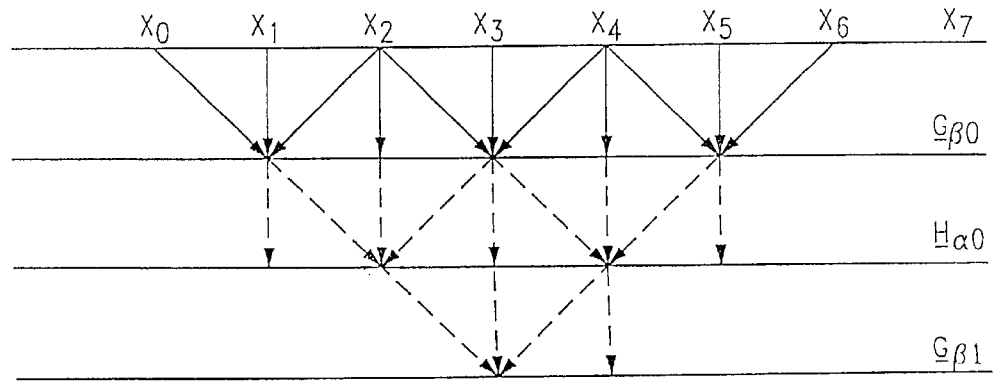
FIG. 11 represents the operation of the filter matrix of FIG. 10.

The 1-D filtering for (3,1) biorthogonal filters as set forth by the operation of equations (13) and (14) is graphically depicted in FIG. 11, which illustrates three layers of (3, 1) filters from which the (7, 5) low-high filters are constructed. The values at the original points $X_0$ to $X_{N-1}$ are calculated for the filtered signal y. Since an even periodic extension is used for the signal, only the external values at $X_{-1}$ and $X_N$ are needed in order to calculate the low-pass and high-pass coefficients at the boundary points $X_0$ and $X_{N-1}$. Therefore, it may be necessary to perform a data reflection at the boundary by periodic image extension with at most one pixel around each boundary point.

For two dimensional (2-D) signals/images, assuming a rectangular grid with image values $x_{i,j}$ the foregoing 1-D transform is first applied on each row as $W_x$ and the 1-D transform is applied on each column as $W_y$. The final combined matrix will be $W_2 = W_x W_y$. The image grid is extended in both directions as an even grid with periods $2(N_x-1)$ and $2(N_y-1)$. After the factorization of the 1-D matrices $W_x$ and $W_y$ the result is the combined matrix:

$$W_2 = \prod_{i=1}^{l} H_{2,\alpha l} G_{2,\beta l} \quad (15)$$

where $$H_{2,\alpha l} = H_{y,\alpha l} H_{x,\alpha l} \quad (16)$$
$$G_{2,\beta l} = G_{y,\beta l} G_{y,\beta l}$$

An alternative form of expressing the high-pass operator $H_2$ is as follows:

$$x^l_{2i+2,2j+1} = x^{l-1}_{2i+2,2j+1} + \alpha_1(x^{l-1}_{2i+2,2j} + x^{l-1}_{2i+2,2j+2}) \quad (17)$$

$$x^l_{2i+1,2j+2} = x^{l-1}_{2i+1,2j+2} + \alpha_1(x^{l-1}_{2i+2,2j} + x^{l-1}_{2i+2,2j+2})$$

$$x^l_{2i+1,2j+2} = x^{l-1}_{2i+1,2j+1} + \alpha_1(x^{l-1}_{2i+1,2j+2} + x^{l-1}_{2i+1,2j+2} + x^l_{2i+2,2j+1} + x^l_{2i+2,2j+1})$$

$$x^l_{2i+3,2j+2} = x^{l-1}_{2i+2,2j+2}$$

Figure 12A:
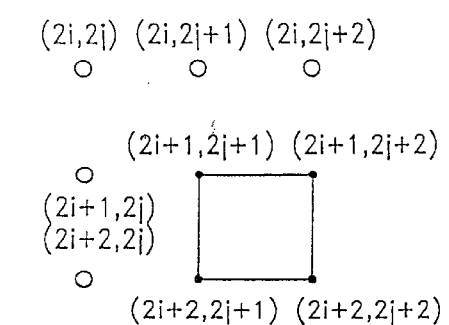
FIGS. 12A and 12B represent the filtering as a two dimensional (2-D) mask.
Figure 12B:
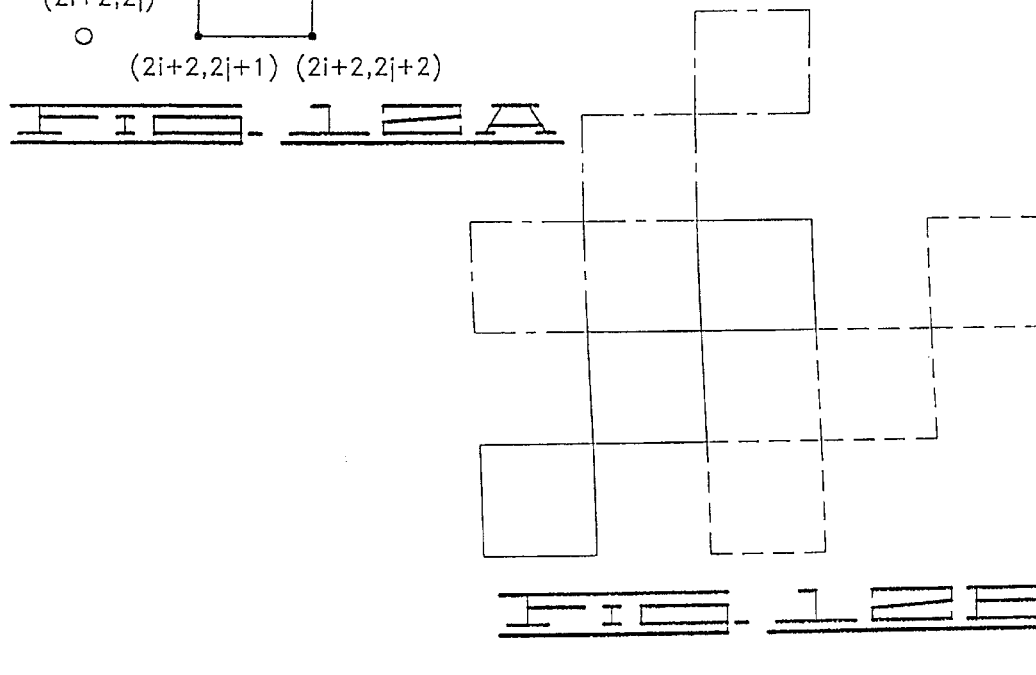

Thus, the high-pass transform $H_{2,\alpha 1}$ takes an average of eight additions and two multiplications per every four image values (which form a 2×2 square). The foregoing set of equations can be considered as a 2-D filtering mask which is moved horizontally two pixels at a time and then vertically two pixels at a time for each iteration. For example, FIG. 12A shows the filtering mask at position (2i+1, 2j+1). The new inputs are represented by the black dots at the corners of the square. The values at the white dots were already calculated and will be used to update the new values. FIG. 12B represents movement of the filtering mask at three different instants: the present instant (solid line), the next horizontal position (dashed line) and the next vertical position (dotted line).

The biorthogonal filters of lengths (9,7), (7,5), (5,3) are factorized into 4, 3, 2 filters respectively of length (3,1). Thus, there are 4, 3, 2 iterations, or layers, of moving masks to be applied to the data. The output of the application of the mask at layer 1 is used as an input for the moving mask of level 1+1 (similar to as shown previously in FIG. 11). However, it will be noted that the transform step of the present invention does not require a 2-D image transposition, which significantly reduces the computational requirements for the transform step. The overall average cost of applying a (2m+1, 2m−1) biorthogonal filter to a 2-D data set is 2m multiplications and 8m additions every four image points forming a 2×2 square. By contrast, the cost of a standard wavelet 2-D convolution with a (2m+1, 2m−1) biorthogonal filter to a 2×2 square of a 2-D image is 34m additions and 8m multiplications. Hence, the novel transform discussed above is at least four times more computationally efficient.

For three dimension (3-D) data cubes, the filter factorization is applied in the three dimensions, with the basic image element to be filtered a 2×2×2 block. The same operations discussed above for 2-D are extended to 3-D with several layers of moving masks. Accordingly, this results in a computational improvement of at least eight times as compared to a wavelet transform of a 3-D image.

Although the foregoing discussion presented wavelet packet transform, it will be noted that the technique can be readily modified using other adaptive transform approaches that utilize basis selection, such as the aforementioned local cosine or brushlet transforms.

Based on the foregoing, the adaptive transformation step 124 of FIG. 2 can now be represented as shown in FIG. 13 to involve application of the low-pass and high-pass filters to the data set, step 142, after which filter factorization is carried out at step 144 to arrive at the desired diagonal matrix (filtering operator) as shown in FIG. 10. The filtering mask is thereafter applied to the data in layers, step 146, as shown in FIG. 12 to arrive at a set of transformed coefficients. Once the adaptive transformation step 124 has been completed, the next step in FIG. 2 is the encoding step 126, which will now be discussed in detail. Generally, the encoding step 126 involves quantization, entropy encoding and run-length encoding. A first preferred approach is set forth by FIG. 14.

As shown by step 152, the transformed coefficients obtained by the transform step 124 are first input, and a thresholding operation is performed at step 154. Threshold level T computation will be discussed shortly, but at this point it will be understood that initially, the coefficients are arranged as an array of floating point numbers. A number b is read from the array and compared to the threshold T, as indicated by decision step 156. If the absolute value of b is greater than the threshold T, then its position is losslessly encoded, the b number is stored in a temporary array of floating numbers and the next floating point number is examined. On the other hand, if the absolute value of b is less than the threshold T, nothing is done to b and the next floating point number in the array is examined.

In this second pass the temporary floating point number array containing the numbers greater than T is checked against a new threshold level determined as two times the initial threshold, that is, 2T. The same process is performed as before, doubling the threshold each time until none of the coefficients remain (i.e., the temporary array size is zero).

Threshold estimation is an iterative process, which preferably involves starting with an estimated value and recalling the number of compressed bytes using T and $2^k T$ for several values of integer k. It is reasonable to assume that the compression rate is a decreasing function of threshold value. Thus, a threshold interval from $2^k T$ to $2^{k+1} T$ is selected, which at the extreme points generates one compression rate above the target compression rate and one below the target rate.

A new estimate of threshold $T_0$ is then found by simply bisecting this threshold interval and assuming that it generates a compression rate above the target compression rate, thereby narrowing the threshold interval to $2^k T, T_0$). This process is repeated several times until an estimated threshold interval is obtained which reaches the target compression rate within a specified tolerance. Alternatively, if the compression input parameter is a desired signal to noise ratio (SNR), then the iterative process is repeated until the estimated threshold results in a SNR close to the specified SNR within a pre-specified tolerance.

Once the threshold has been determined, the flow of FIG. 14 continues to step 158, wherein an exact compression rate is preferably achieved. This is accomplished by computing a threshold such that the resulting number of bytes is slightly smaller than the target number of compressed bytes. Thereafter, a few dummy bytes are added to achieve the exact number of bytes.

Achieving an exact number of bytes has several practical advantages. First, all compressed seismic data gathers have exactly the same number of bytes. Particularly, each gather will have a number of time series (traces), with each trace having a particular number of samples. So, for example, a gather might consist of 100 traces, each with 1000 samples. Using an exact compression scheme allows the compressed gathers to be treated in an input/output manner as with the uncompressed gathers, and in the case of 1-D compression, the compressed traces will be in the same exact order as in the uncompressed traces, allowing sorting of the compressed traces in a desired domain.

Moreover, during subsequent analysis of the stored compressed data, users typically only wish to decompress and evaluate selected gathers. With an exact compression ratio, a user can quickly navigate directly to the first byte of the desired gather by using, for example, a standard C programming language fseek command. To compare and contrast, assuming a seismic data set with 50 million gathers, with 10 megabytes ($10 \times 10^6$ bytes) per gather, so that the entire data set (uncompressed) is 0.5 terabytes in size, and gathers no. 43,675,223 to 43,675,375 are desired.

With perfect 10:1 compression, the byte pointer can be navigated to the very first byte of gather 43,675,223 and from that point on the user can read the subsequent desired gathers. On the other hand, with a compression ratio close to, but not exactly 10:1, the decompression routine has to read the beginning of each compressed gather the number of bytes involved in each gather, and keep skipping forward until the desired gather is identified. Such operations can take substantial amounts of time and can accordingly be economically inefficient as well as frustrating to the user.

Continuing with FIG. 14, the next step, 160, involves run length coding of the threshold coefficient positions. This position coding is lossless and involves alternating (flip) coding on the position bit representation of zeroes and ones. Basically, as will be recognized flip coding involves changing a successive number of zeroes up to the next one. The subsequent number of ones are coded up to the next zero. This flip coding is a form of run length coding, wherein the coded run length is a positive integer which is coded simply by padding zeroes to the left of the most significant one in the number so that the most significant one is in the middle of the bit sequence.

Once the run length coding of step 160 has been completed, the routine continues to step 162 where coding of the threshold coefficients takes place. This value coding is accomplished in a different way. First, the sign bit (bit 32) is coded as zero for positive floating numbers and one for negative floating numbers. Then, since the first significant bit is now one for the latter, the first non-significant bit of the positive integer |b| is coded and this is repeated until all the non-significant bits are exhausted. The final result is a list array of unsigned integers which contains first, the maximum number of bits used for coding values which equals the maximum number of non-significant bits and the sign bit, and second, alternatively the number of bytes for the run length of the position and the number of bytes for the corresponding value for each of the levels of the transformed and quantized coefficients. Hence, this involves an iterative process to arrive at the final coding.

A different, but related alternative to the encoding steps set forth by the flow of FIG. 14 involves initially coding the value at once and not through an iterative process (i.e., through different loops). In this alternative approach, each value is coded in such a way that not only the non-significant bits are coded, but the sequence also indicates how many of the non-significant bits are used by proving a symmetric bit sequence 000 . . . 1, where 1 is the leading bit.

The number of the non-significant bits are obtained in three steps. First, the value is normalized by the inverse of the threshold value. Second, the quantized floating point number is examined; the bit 32 is the sign bit and the bits 24–31 are the exponent bits. This 8-bit number minus 127 provides the 2-exponent of the float which is the same as the number m of the non-significant bits which are encoded. If m is small, for example smaller than 13, the entire 000 . . . 1 string and the m non-significant bits can be coded by casting the normalized absolute value to an integer and masking to zero all bits higher than 2m+1. If the number of non-significant bits m is larger than 13, then the number of bits is loaded to a bitstring buffer m several steps in order not to run out of space in the buffer.

Both of these coding schemes utilize non-uniform quantization, in contrast to the prior art seismic data compression schemes which employ uniform quantization, such as used in fingerprint analysis systems.

In a third, alternative coding scheme, the coding step is applied to unsigned integers instead of to floating point numbers. This coding method employs a novel non-uniform quantization step. Generally, instead of performing floating point number multiplication between the floating point number $f \times (1/T)$ and the threshold, a quasi-multiplication is performed between unsigned integers, expressed as $f @ (1/T)$. This quasi-multiplication is defined by the following relation:

$$ui(f@g)=ui(f)+ui(g)-ui(1.0) \qquad (18)$$

where ui(f) is the unsigned integer that has the same bit representation as the floating point number f. By also defining:

$$Ui(f)=ui(f)-ui(1.0) \qquad (19)$$

the quasi-multiplication step can be defined as:

$$Ui(f@g)=Ui(f)+Ui(g) \qquad (20)$$

with the quasi-multiplication satisfying the following inequalities:

$$(8/9)f \times g \leq f@g \leq f \times g \text{ and if } f<g \text{ is equivalent to } ui(f)<ui(g) \qquad (21)$$

Thus, all the testing on the threshold T is performed on the unsigned integer representation of the floating point number. The normalization of the floating point number f to the threshold T now becomes a subtraction operation, as:

$$Ui(fn)=ui(f)-ui(T) \qquad (22)$$

where fn is the normalized value of f when divided by the threshold T.

In this third alternative coding scheme, the unsigned integers ui(fn) are coded in the same way as in the second coding scheme discussed above, by first coding the sign bit (bit 32) and the bits 24 to 24-m where m is the number of non-significant bits.

Irrespective of the alternative selected for the encoding step 126, it will be recognized at this point that as a result of the operation of steps 124 and 126, the compressed data will have a known localized time/space, frequency, phase and direction. Thus, each compressed seismic gather is organized for further processing in the compressed domain. For example, for seismic depth imaging or Radon transform using compressed data it is very important to have the compressed data organized in such a way that not only their time/space and frequency localization is known, but their local orientation is also known. Orientation is a characteristic of each particular point in the compressed data set that allows identification of the location of the point with respect to the time and space axes, and such orientation information is not available in compressed data sets that are compressed using prior art techniques.

Coding the seismic data by employing the methods discussed above prepares the compressed data for subsequent processing without any decompression; that is, processing directly in the compressed domain. There are tremendous benefits in terms of cycle time and cost reduction involved by processing compressed seismic data, instead of original uncompressed data. It is contemplated that the reduction of cycle time can be more than an order of magnitude, so that instead of requiring six months to complete a seismic data imaging project in the uncompressed domain, the same project can be completed in a few days in the compressed domain.

Referring again to FIG. 2, it will be noted that at the conclusion of the operation of the steps 124 and 126, the decision step 128 inquires whether further compression layers are desired. Such operation will now be briefly discussed. Assuming an image g(i, j) and a compression ratio or a signal to noise ratio (SNR), a compressed/decompressed image is obtained, $g^0$, which when subtracted from the original image leads to a residual image $g^1$, in other words:

$$g(i, j)=\hat{g}^0(i, j)+g^1(i, j) \qquad (23)$$

The residual image $g^1(i, j)$ is compressed at the same compression ratio, or at a different compression ratio than the first compression/decompression. However, since it is known that the residual image contains features which were not adequately modeled with the orthogonal/biorthogonal mathematical basis used in the first pass through step 124, a different basis is used which is more adapted to the residual features. This basis can be adaptively selected using the best basis algorithm. Hence, after the second compression/decompression layer (i.e., after the second time through steps 124, 126), the resulting relationship follows:

$$g^1(i, j)=\hat{g}^1(i, j)+g^2(i, j) \qquad (24)$$

It can be seen that two different sets of features have been modeled and removed from the image during the compression/decompression steps: first, the features corresponding to the first compression layer mathematical basis and second, the features corresponding to the second compression layer mathematical basis. By way of example, the first set of features may correspond to a set of horizontal/vertical edges and the second set of features may correspond to a set of smooth textures. Several more compression/decompression layers can be added on top of the first two layers, leading to residual images of smaller and smaller amplitude and more random features. After a number n iterations of compression/decompression, a final result can be obtained as follows:

$$g^n(i, j)=\hat{g}^n(i, j)+g^{m-1}(i, j) \qquad (25)$$

The residual image $g^{n+1}(i, j)$ has very small residuals and there are no remaining coherent features and structures which can be extracted; hence, the residual image can be characterized as noisy and random. The final user of the multi-layered compression/decompression methodology can obtain a lossless compression by entropy coding the final residual image. In other words, the n layer (iterations) of the compression, combined with the final residual image which can be entropy encoded provide a lossless compression/decompression method.

It will be noted that different features can be coded adaptively at the different layers of the compression by employing the best basis each time. The final compression ratio is computed as the harmonic average of the compression ratios applied in the several layers of the compression routine.

Figure 15:
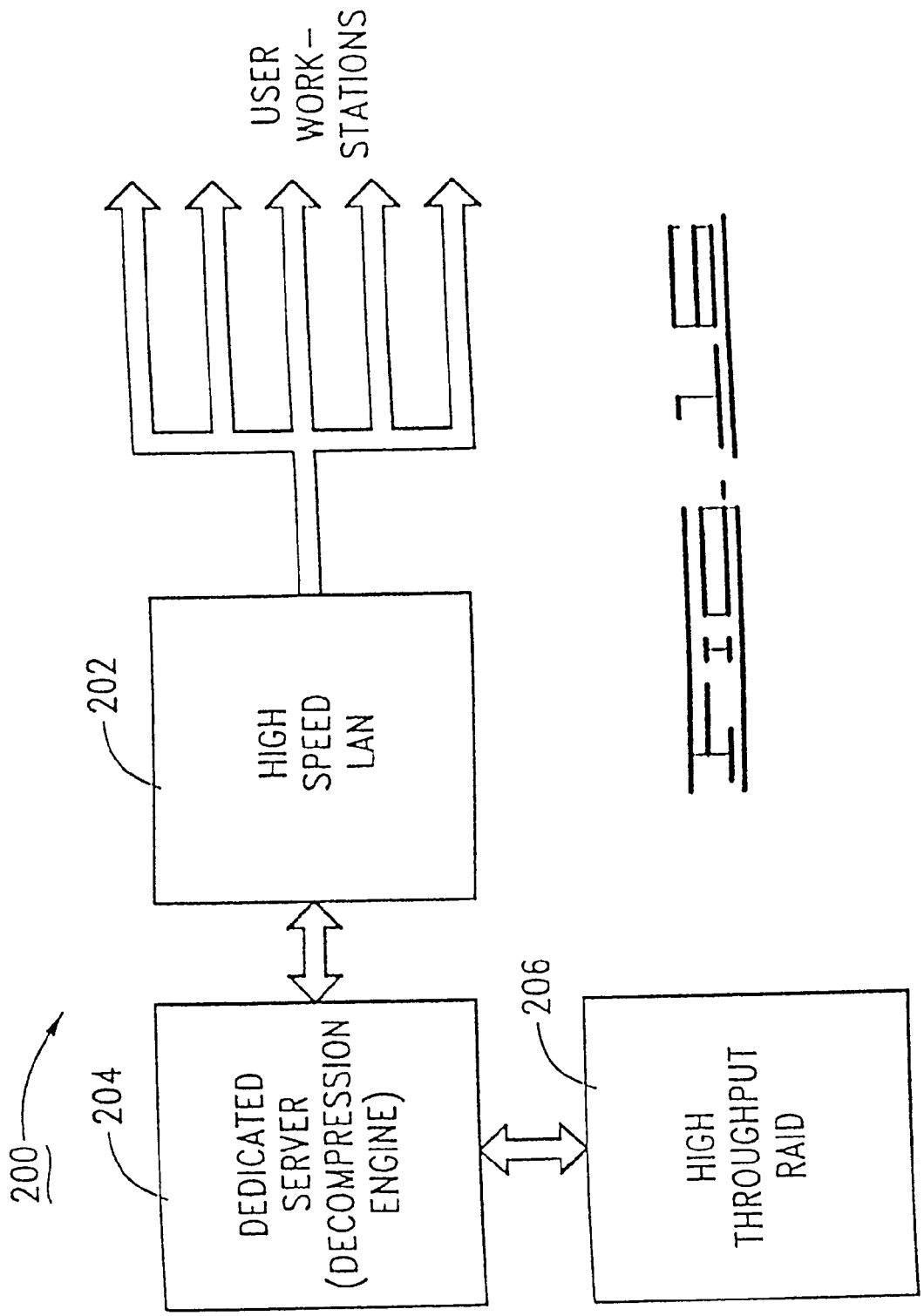
FIG. 15 is a flow chart for a SEISMIC DATA DECOMPRESSION routine, illustrating steps carried out in accordance with preferred embodiments to decompress data previously compressed by the operation of the routine of FIG. 2.

Having now concluded a discussion of the data compression routine of FIG. 2, reference is made to FIG. 15 which shows a SEISMIC DATA DECOMPRESSION routine 170, which is illustrative of steps carried out to restore the data compressed by the routine of FIG. 2, in accordance with preferred embodiments of the present invention. It will be recognized that the routine of FIG. 15 reverses the steps of FIG. 2.

At step 172, the compressed data file is obtained, as well as the number of compression layers utilized during the operation of FIG. 2. The latter was stored by the operation of step 130. Decoding is next applied at step 174, wherein run length decoding of the quantized transformed coefficient positions and values is performed. It will be noted that the operation of step 174 will depend upon the particular alternative coding scheme originally carried out by step 126 (for example, whether uniform or non-uniform quantization was performed, etc.). At step 176, an adaptive inverse transform operation is carried out and decision step 178 determines whether all of the iterations have been performed; hence, the inverse transform is performed for each of the layers, using the different mathematical bases originally employed until all of the compression layers are exhausted. Finally, as shown by step 180, the decompressed residuals and the decompressed data from the first iteration are summed together to obtain the final decompressed (original) output data set. The routine then ends at 182.

With reference again to FIGS. 2 and 15, in a preferred embodiment, software corresponding to at least portions of the decompression routine of FIG. 15 are combined with the results of the compression routine of FIG. 2, including the compressed data set, the compressed residuals, and the number of iterations information into a single computer data file to provide a self-extracting output (for example, with a ".exe" DOS extension). An advantage of this approach is the ability to generate and transmit such self-extracting output to a remote site via a high speed communication link (local area network (LAN), wide area network (WAN), internet, satellite communication system, etc.). At the remote site, a user would merely execute the decompression automatically and then process the decompressed data using on-site image processing software.

Another advantageous feature of the compression/decompression methodology discussed above can be understood with a brief review of typical present seismic data processing environments. In a typical LAN used in the oil and gas industry, several geophysicists' workstations are usually networked together through a high speed interface, with specified transfer rates of, for example, 100 megabit per second (Mb/sec). The workstations obtain seismic files through a network file server (NFS). In practice, however, due to normal processing demands the effective transfer rate of a typical NFS server is usually only around 4 Mb/sec which makes data transfer operations very slow, especially when several seismic files have been requested.

Presently, high performance fibre-channel network equipment is available, such as high speed servers and RAID (disc drive) arrays which can provide sustained data transfer rates in the several tens of megabytes per second (Mbytes/sec). Accordingly, FIG. 16 provides a functional block diagram of a local area network (LAN) based system 200 in which the foregoing compression/decompression routines can be advantageously implemented.

The system 200 includes conventional portions of a typical high speed network, as represented by block 202. Additionally, however, the LAN 202 is connected via high-speed link to an NFS compression server 204, which is a dedicated decompression engine. The server 204 is contemplated as having programming necessary to carry out the aforementioned compression and decompression routines. A high capacity, high speed RAID array 206 is also provided as shown which stores the seismic data in compressed format.

During operation, a user requests a selected gather to review at the associated workstation. Since the compressed byte budget is computed precisely, the server 204 can efficiently identify the desired gather. Moreover, the server 204 decompresses the data from the RAID on-the-fly, that is, at a throughput rate that matches the rate at which the data are transferred from the RAID 206. Accordingly, the decompression time is transparent to the user, allowing smaller data storage requirements (since the data are stored in compressed format) and faster access, times (since the data can be decompressed at a rate that exceeds the transfer rate capabilities of the RAID 206).

Another manner in which the compression/decompression methodology of the present invention can be advantageously utilized is in an Application Service Provider (ASP) environment. As will be recognized by those skilled in the art, recent advances in high speed communication links (most notably the internet) have resulted in entities (ASPs) who serve as remote sites for other users to execute licensed software from third parties. This provides several important advantages to the users who are relieved from obtaining separate licenses for the software, providing in-house support for the software, providing local data storage, etc.

Accordingly, a user of seismic data can initially compress an initial data set using the routine of FIG. 2 and transmit the compressed data set to an ASP having authorized licenses to appropriate seismic data processing software and/or seismic interpretation software. The user can then access the seismic data processing or interpretation software remotely via a web browser, for example, and decompress (if necessary) and process the data on the remote ASP server. Once the desired operations have been completed, the user can proceed to compress the data on the remote server and initiate a transfer of the compressed processed data back to the user's facility.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for compressing a seismic data set composed of a plurality of seismic gathers of size M to form a final compressed seismic data set of size N where N is less than M and M/N is a desired compression ratio, the method comprising steps of:

(a) providing a filter bank of size (u, u) or (u, v), respectively, with u=(2m+1) and v=(2m−1) so that the filter bank comprises a low pass filter with (2m+1) elements in tandem with a high pass filter with (2m+1) or (2m−1) elements, respectively, where m is an integer;

(b) factorizing the filter bank into a corresponding set of m layered filter banks of size (1,1) or (3,1), respectively, so that each of the m layered filter banks comprises an elementary low pass filter with 1 or 3 elements, respectively, in tandem with an elementary high pass filter with 1 element;

(c) identifying the initial seismic data set as a selected seismic data set for processing;

(d) performing an adaptive best-basis transform on the selected seismic data set to generate a set of transformed coefficients by algebraically combining the m layered filter banks with the selected seismic data set and selecting a best basis from a library of orthogonal/biorthogonal bases that provides an optimal approximation of the selected seismic data set, each transformed coefficient having a position and a value;

(e) encoding the transformed coefficients using run-length coding of the transformed coefficient positions and non-uniform scalar quantization of the transformed coefficient values to generate a quantized seismic data set of size P less than M;

(f) subtracting the quantized seismic data set from the selected seismic data set to generate a residual data set; and (g) repeating steps (d) through (f) a number of passes n using the most recently generated residual data set of step (f) as the selected seismic data set in each pass to generate the final compressed seismic data set of size N, wherein the final compressed seismic data set comprises the quantized seismic data sets obtained during each pass of step (e) and the final residual data set.

2. The method of claim 1, wherein the initial seismic data set comprises a plurality of seismic gathers of identical size Q, and wherein the final compressed seismic data set comprises a corresponding plurality of compressed seismic gathers of identical size R so that Q/R=M/N.

3. The method of claim 2, wherein each seismic gather of the initial seismic data set is organized as a plurality of sequentially ordered traces with each of the traces having a common number of samples, and wherein the application of the adaptive transform is carried out in a single dimension so that the compressed seismic data set comprises a corresponding plurality of compressed traces in the same order as the traces of the initial seismic data set.

4. The method of claim 1, wherein the factorization of step (b) comprises multiplying consecutive pairs of filter coefficients by a series of orthonormal 2×2 matrices Ri, with i ranging from 1 to m, each of the 2×2 matrices Ri having consecutive elements in a row by row mode equal to (1, −a, a, 1) with the element a characterized as a ratio of filter coefficient L divided by filter coefficient L-1, and wherein each matrix Ri is divided by the square root of $(1+a^2)$ to make each matrix Ri orthonormal.

5. The method of claim 1, wherein the encoding of step (e) comprises steps of:

(e1) arranging the threshold coefficient values as an array of numbers;

(e2) selecting an initial threshold;

(e3) comparing the absolute magnitude of each of the numbers of step (e1) to the initial threshold; and (e4) adjusting the threshold to a new value and repeating step (e3) until a final threshold is identified that achieves the desired size P.

6. The method of claim 1, further in combination with a method for subsequently decompressing the final compressed seismic data set to provide an uncompressed seismic data set of size M nominally identical to the initial seismic data set, comprising steps of:

(h) identifying the final compressed seismic data set as a selected data set for decompression processing;

(i) decoding the selected data set to remove the run-length coding of the associated transform coefficient positions and the quantitization of the associated transfer coefficient values;

(j) applying an inverse best-basis transform to the decoded transform coefficients of step (i); and (k) repeating steps (i) and (j) the number of n passes,of step (g) to generate the uncompressed seismic data set.

7. The method of claim 6, wherein the compressed seismic data set is stored in a computer storage device attached within a computer network having a selected data transfer rate, and wherein steps (h) through (k) are performed by a computer configured to operate as a decompression engine attached within the computer network, and wherein, in response to a user request for a selected subset of the initial data set, the decompression engine performs on-the-fly decompression of a corresponding subset of the compressed seismic data set at a rate faster than the specified transfer rate so that the on-the-fly decompression is transparent to the user.

8. The method of claim 6, wherein a single self-extracting computer file is formed from a combination of the final compressed seismic data set and programming that carries out steps (h) through (k) so that the uncompressed seismic data set is obtained by execution of the self-extracting computer file.

9. An apparatus for storing and retrieving seismic data, wherein a dedicated compression engine compresses the initial data set by a method comprising steps of: (a) providing a filter bank of size (u, u) or (u, v), respectively, with u=(2m+1) and v=(2m−1) so that the filter bank comprises a low pass filter with (2m+1) elements in tandem with a high pass filter with (2m+1) or (2m−1) elements, respectively, where m is an integer; (b) factorizing the filter bank into a corresponding set of m layered filter banks of size (1,1) or (3,1), respectively, so that each of the m layered filter banks comprises an elementary low pass filter with 1 or 3 elements, respectively, in tandem with an elementary high pass filter with 1 element; (c) identifying the initial data set as a selected data set for processing; (d) performing an adaptive best-basis transform on the selected data set to generate a set of transformed coefficients by algebraically combining the m layered filter banks with the selected data set and selecting a best basis from a library of orthogonal/biorthogonal bases that provides an optimal approximation of the selected data set, each transformed coefficient having a portion and a value; (e) encoding the transformed coefficients using run-length coding of the transformed coefficient positions and non-uniform scalar quantization of the transformed coefficient values to generate a quantized data set of size P less than M; (f) subtracting the quantized data set from the selected data set to generate a residual data set; and (g) repeating steps (d) through (f) a number of passes n using the most recently generated residual data set of step (f) as the selected data set in each pass to generate the final compressed data set of size N, wherein the final compressed data set comprises the quantized data sets obtained during each pass of step (e) and the final residual data set; (h) and further providing a computer network connecting a plurality of user workstations; (i) a high pass throughput storage device connected to the computer network having a specified transfer rate, the storage device storing a final compressed data set of size N having a compression ratio M/N with respect to an initial data set of size M: and a dedicated decompression engine, connected to the computer network and the storage device, comprising a computer having associated programming to decompress the compressed data set, wherein in response to a request by a user of the network for a selected portion of the initial data set, the decompression engine performs on-the-fly decompression of a corresponding portion of the compressed data set to provide the selected portion of the initial data set to the user at a rate faster than the transfer rate of the storage device so that the on-the-fly decompression is transparent to the user.

10. The method of claim 9, further in combination with a method comprising a step of transferring the compressed seismic data set to a remote site using a data communication link.

11. The apparatus of claim 9, wherein the initial data set comprises a plurality of seismic gathers of identical size Q, and wherein the final compressed data set comprises a corresponding plurality of compressed seismic gathers of identical size R so that Q/R=M/N.

12. The apparatus of claim 11, wherein each seismic gather of the initial data set is organized as a plurality of sequentially ordered traces with each of the traces having a common number of samples, and wherein the application of the adaptive transform is carried out in a single dimension so that the compressed data set comprises a corresponding plurality of compressed traces in the same order as the traces of the initial data set.

13. The apparatus of claim 9, wherein the factorization of step (b) comprises multiplying consecutive pairs of filter coefficients by a series of orthonormal 2×2 matrices Ri, with i ranging from 1 to m, each of the 2×2 matrices Ri having consecutive elements in a row by row mode equal to (1, −a, a, 1) with the element a characterized as a ratio of filter coefficient L divided by filter coefficient L−1, and wherein each matrix Ri is divided by the square root of $(1+a^2)$ to make each matrix Ri orthonormal.

14. The apparatus of claim 9, wherein the encoding of step (e) comprises steps of:

(e1) arranging the threshold coefficient values as an array of numbers;

(e2) selecting an initial threshold;

(e3) comparing the absolute magnitude of each of the numbers of step (e1) to the initial threshold; and (e4) adjusting the threshold to a new value and repeating step (e3) until a final threshold is identified that achieves the desired size P.

* * * * *

UNITED STATES PATENT AND TRADEMARK OFFICE
CERTIFICATE OF CORRECTION

PATENT NO. : 6,594,394 B1  
DATED : July 15, 2003  
INVENTOR(S) : Stromberg et al.

It is certified that error appears in the above-identified patent and that said Letters Patent is hereby corrected as shown below:

<u>Title page,</u>
Item [75], Inventor, name "Anthony A. Vaddiliou" should read
-- Anthony A. Vassiliou --
*Assistant Examiner's* name "Amir Alaui" should read -- Amir Alavi --.

Signed and Sealed this

Twenty-fifth Day of November, 2003

JAMES E. ROGAN
*Director of the United States Patent and Trademark Office*